United States Patent [19]

Chou

[11] Patent Number: 5,671,580

[45] Date of Patent: Sep. 30, 1997

[54] FRAME ASSEMBLY

[76] Inventor: Kuo-Hua Chou, No. 17, Alley 10, Lane 118, Su-Wei Rd., Wu-Ku Hsiang, Taipei County, Taiwan

[21] Appl. No.: 590,198

[22] Filed: Jan. 23, 1996

[51] Int. Cl.$^6$ ..................................................... E04C 2/38
[52] U.S. Cl. .................. 52/656.4; 52/656.9; 52/655.1; 52/653.2; 403/230; 403/231; 403/401; 403/402; 160/381
[58] Field of Search .................. 52/656.4, 656.1, 52/656.2, 656.9, 655.1, 653.2, 736.2, 475.1; 403/230, 231, 205, 401–403; 160/381

[56] References Cited

U.S. PATENT DOCUMENTS

| | | | |
|---|---|---|---|
| 3,782,054 | 1/1974 | Goss | 52/656.9 X |
| 3,949,526 | 4/1976 | Sherlock et al. | 52/616 X |
| 4,222,209 | 9/1980 | Peterson | 52/656.9 X |
| 4,651,482 | 3/1987 | Borys | 52/656.9 X |
| 4,665,676 | 5/1987 | Drzemala | 52/656.9 |
| 4,683,634 | 8/1987 | Cole | 52/656.9 X |
| 4,909,005 | 3/1990 | Adams | 52/656.9 X |
| 5,040,456 | 8/1991 | Hayes | 403/402 X |

Primary Examiner—Carl D. Friedman
Assistant Examiner—Beth Aubrey
Attorney, Agent, or Firm—Morton J. Rosenberg; David I. Klein

[57] ABSTRACT

A frame assembly for doors, windows and the like includes a fastening element consisting of a longitudinal connecting portion and a transverse clamping portion, a first frame provided with a plurality of locking holes and a second frame provided with two fastening holes. The connecting portion has a side plate extending substantially perpendicular to either lateral side thereof and is provided with a plurality of threaded holes at an upper portion thereof for matching the locking holes. The clamping portion consists of a clamp plate punched and bent from a middle portion of the connecting portion and a grip plate in a relative clamping relationship with the clamp plate; the grip plate being provided with two projecting hook pieces for matching the fastening holes. The connecting portion may be inserted into the first frame so that they may be locked firmly and conveniently by screws. The clamping portion is fitted onto a rear side of the second frame such that the hook pieces of the grip plate hook against the fastening holes in the second frame to ensure the assembly.

2 Claims, 6 Drawing Sheets

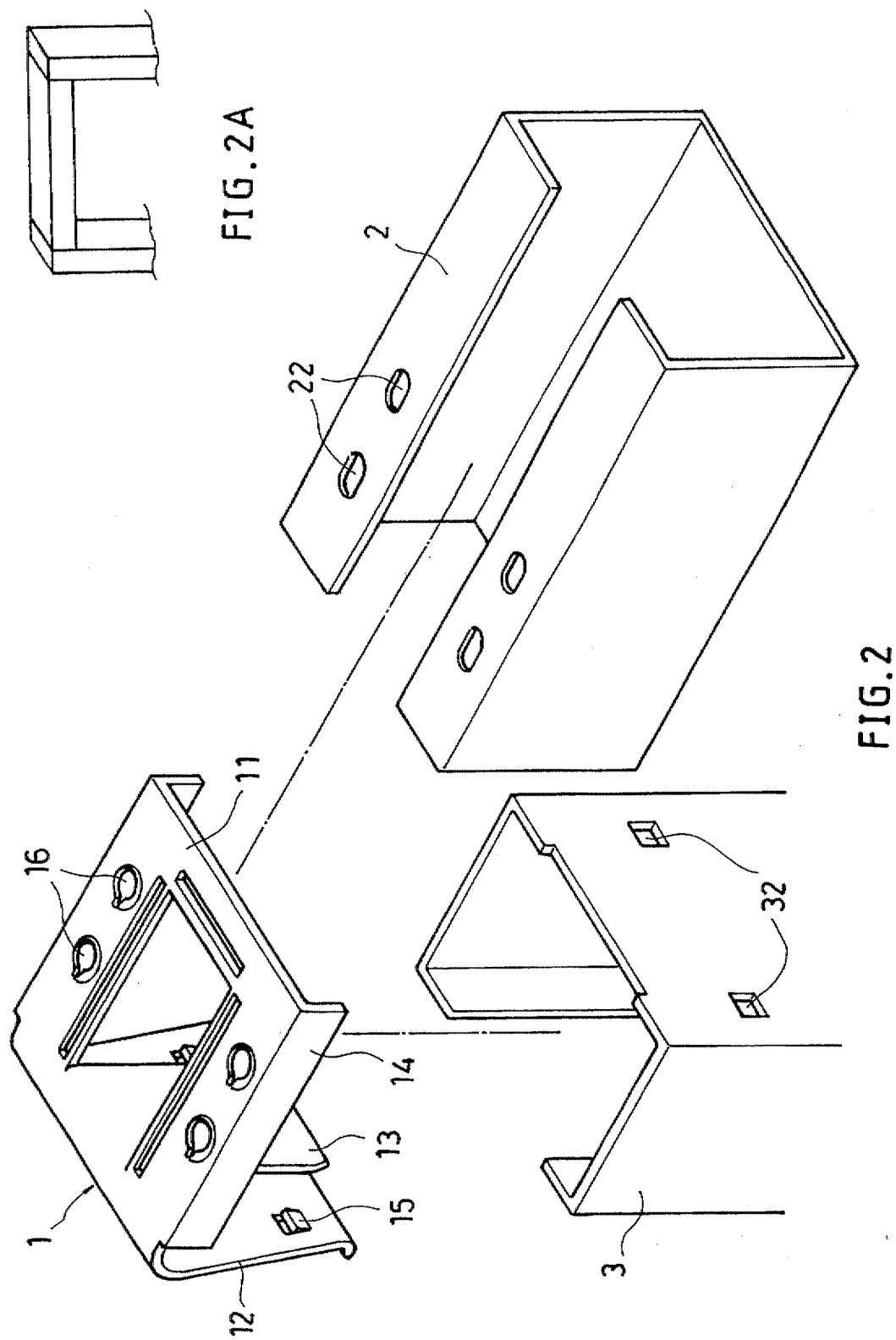

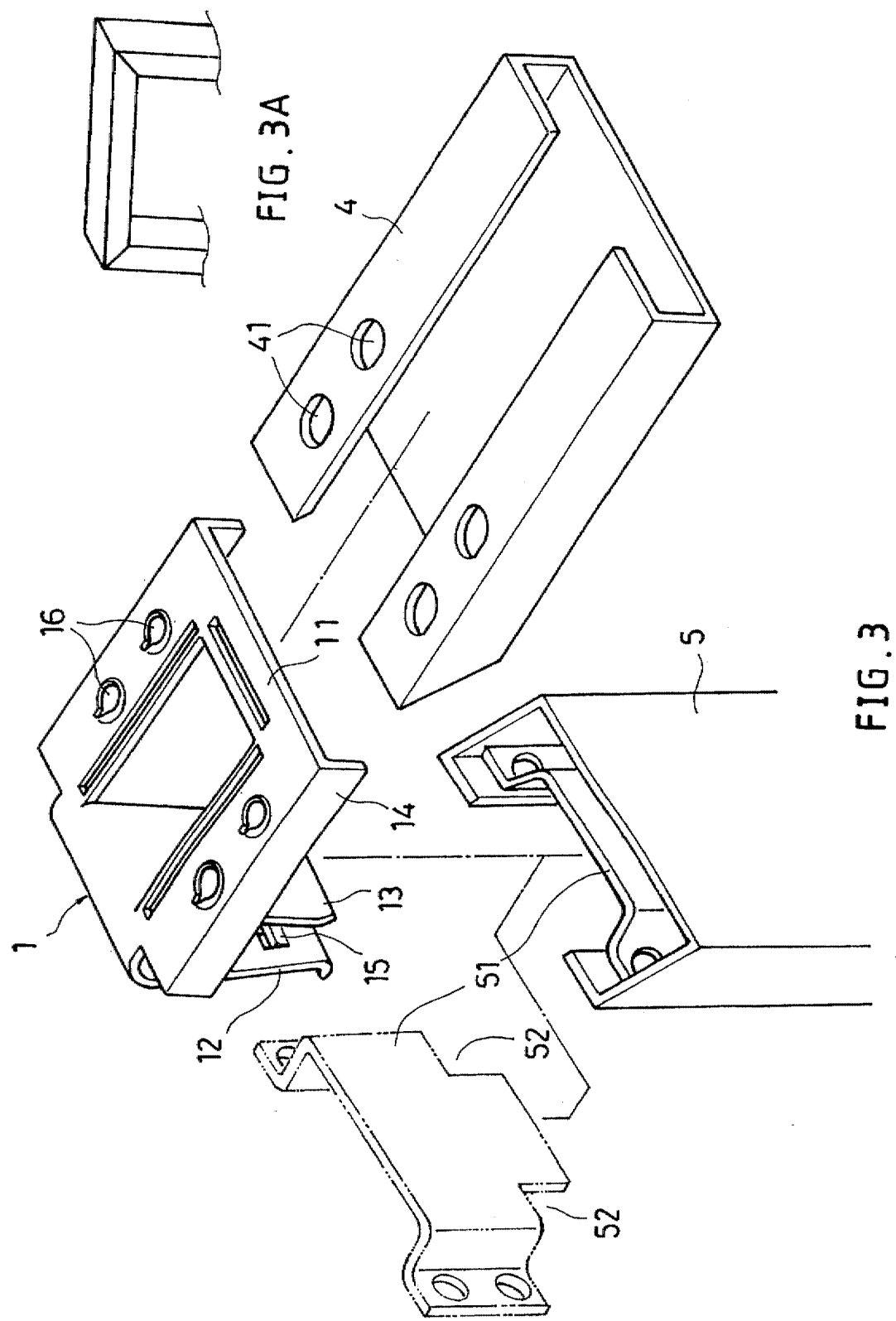

5,671,580

FRAME ASSEMBLY

BACKGROUND OF THE INVENTION (a) Field of the Invention

The present invention relates generally to a frame assembly for doors, windows and the like, and more particularly to a frame assembly which is convenient and speedy to assemble.

(b) Description of the Prior Art

Conventional frame assemblies for doors, windows and the like generally fall into the following three main types:

1. Referring to FIG. 4, welding is commonly used for securing plain miter joints of door and window frames. However, the weld portion 6 will be uneven and hence unsightly. The outer appearance of the door or window will be marred even after repeated polishing. Besides, it is difficult to adjust or change the position of the frames after the completion of welding.

2. With reference to FIG. 5, there is shown a conventional way of joining frames of planar ends, two longitudinal frames 73 respectively provided with a hole in an upper lateral side thereof are joined by an intermediate transverse frame 72 having two through holes at either end thereof. An iron bar 7 is passed through the holes of the transverse frame 72 with both ends inserted into the respective holes of the longitudinal frames 73 on both sides thereof. Corresponding nuts 71 are further secured in place. However, such a construction is very complicated and cost-consumptive.

3. FIG. 6 illustrates another way of joining frames of planar ends. A plastic plug means 8 is inserted into a hollow upper end of a longitudinal frame 83, and a screw 81 is driven into a transverse frame 82 into the plug means 8 to secure the transverse frame 82 onto the longitudinal frame 83. However, since the plastic plug means 8 may deteriorate after a period of use, its strength will be seriously affected. Besides, it will be necessary to assemble the frames in their entireties before delivery to the job site. Transportation is therefore inconvenient and costly.

SUMMARY OF THE INVENTION

Accordingly, a primary object of the present invention is to provide a frame assembly for doors, windows and the like for convenient and speedy construction, in which a fastening element is provided for connecting a longitudinal frame and a transverse frame by means of a specially designed clamping portion and a connecting portion.

BRIEF DESCRIPTION OF THE DRAWINGS

The foregoing and other features and advantages of the present invention will be more clearly understood from the following detailed description and the accompanying drawings, in which.

FIG. 2 is an elevational exploded view of a second preferred embodiment of the frame assembly of the invention;

FIG. 2A is a schematic view of the frame assembly of FIG. 2 in an assembled state;

FIG. 3 is an elevational exploded view of a third preferred embodiment of the frame assembly of the invention;

FIG. 3A is a schematic view of the frame assembly of FIG. 3 in an assembled state;

DETAILED DESCRIPTION OF THE PREFERRED EMBODIMENT

Figures 1, 1A:
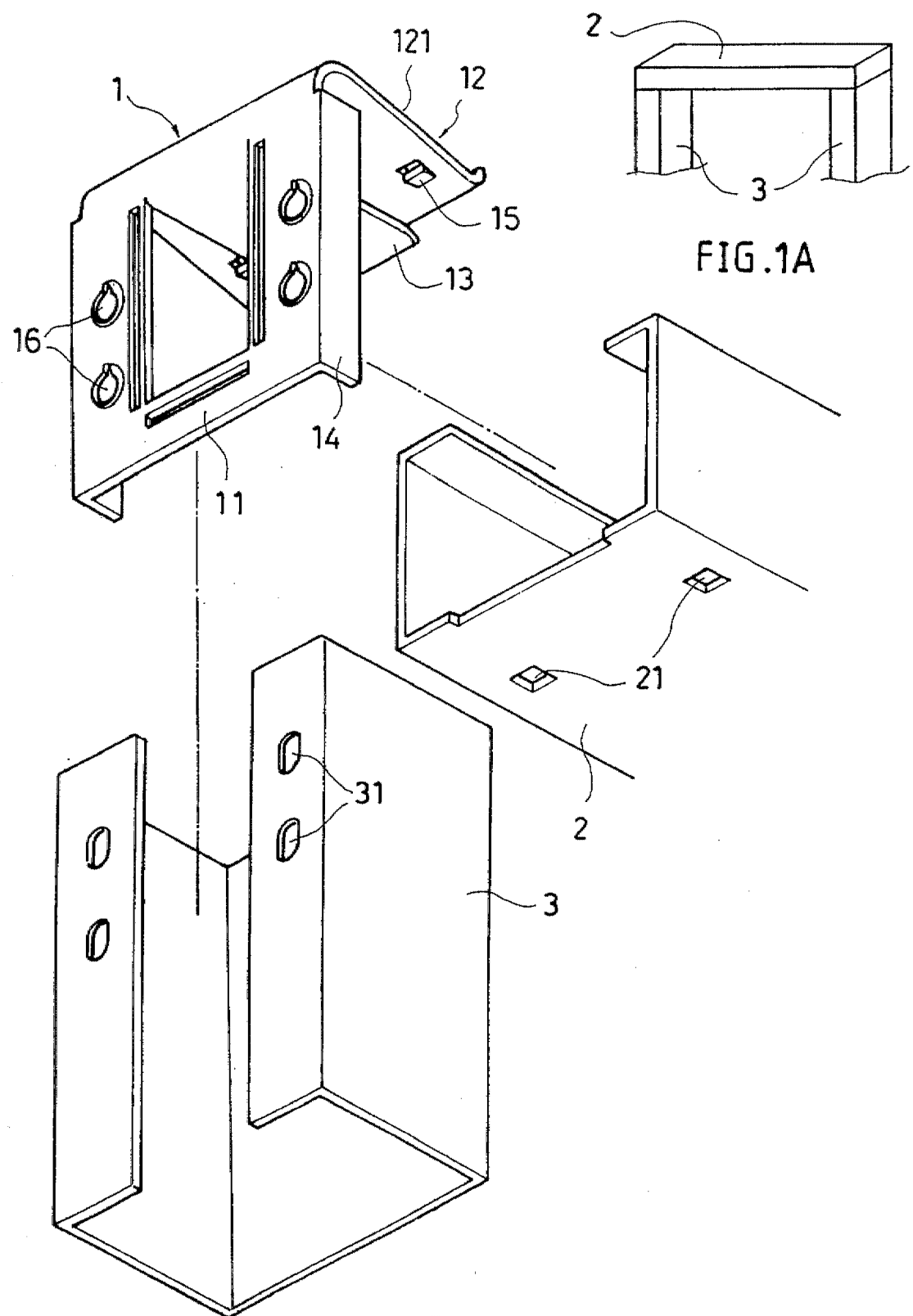
FIG. 1 is an elevational exploded view of a first preferred embodiment of a frame assembly according to the present invention.
FIG. 1A is a schematic view of the frame assembly of the invention in an assembled state.

With reference to FIGS. 1 and 1A, a preferred embodiment of the frame assembly for doors, windows and the like according to the present invention essentially comprises a substantially right-angled fastening element 1 having a longitudinal connecting portion 11 which has a side plate 14 disposed at a substantially right angle to either lateral side thereof. The connecting portion 11 may be suitably and firmly fit into a longitudinal frame 3. The connecting portion 11 is further provided with a plurality of threaded holes 16 which corresponds to a plurality of locking holes 31 in a front side of the longitudinal frame 3 such that, when the connecting portion 11 is fitted into the longitudinal frame 3, a plurality of screws may be passed through the locking holes 31 and the threaded holes 16 to lock and position them firmly and speedily. The fastening element 1 also consists of a substantially transversely oriented clamping portion 12 which in turn consists of a clamp plate 13 punched from a middle portion of the connecting portion 11 and further bent to a position substantially perpendicular to thereto and a grip plate 121 in a relative clamping relationship with the clamp plate 13. The grip plate 121 and the clamp plate 13 may be utilized to clamp onto a rear side of a transverse frame 2. Hence, by using the fastening elements 1 according to the present invention, doors, windows and frames may be secured in place with convenience. Besides, the grip plate 121 is further provided with two projecting hook pieces 15 disposed respectively on both sides near a lower rim thereof such that, when both the grip plate 121 and the clamp plate 13 are fitted onto the rear side of the transverse frame 2, the hook pieces 15 may project through two corresponding fastening holes 21 in the transverse frame 2 to ensure the connection.

Figure 2B:
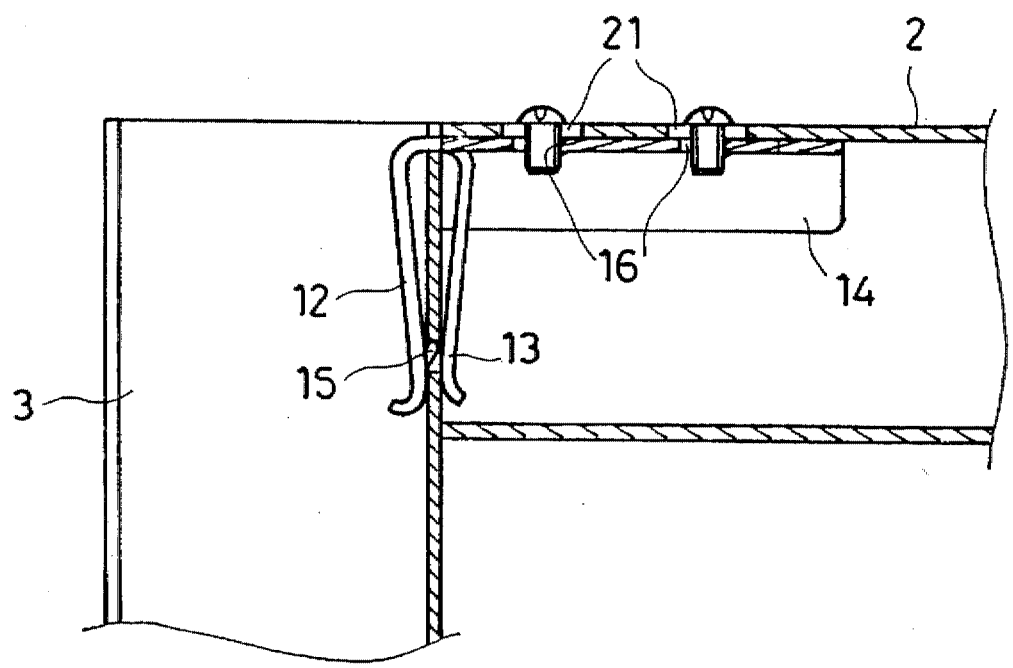
FIG. 2B is a sectional view of the frame assembly of FIG. 2.

FIGS. 2, 2A, and 2B illustrate a second preferred embodiment of the frame assembly according to the present invention used in another example. In this example, the connecting portion 11 is fitted into the transverse frame 2 while the grip plate 121 and the clamp plate 13 together clamp a rear side of the longitudinal frame 3. Accordingly, the transverse frame 2 is configured to have a plurality of locking holes 22 for matching the plurality of threaded holes 16 of the connecting portion 11 while the longitudinal frame 3 is provided with two fastening holes 32 for receiving the projecting hook pieces 15 of the grip plate 121.

Figure 3B:
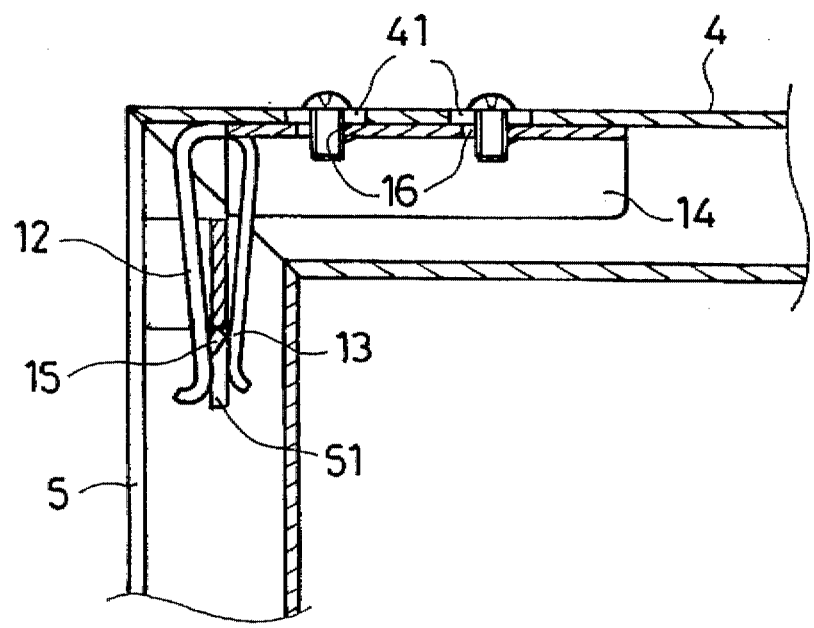
FIG. 3B is a sectional view of the frame assembly of FIG. 3.
Figure 4:
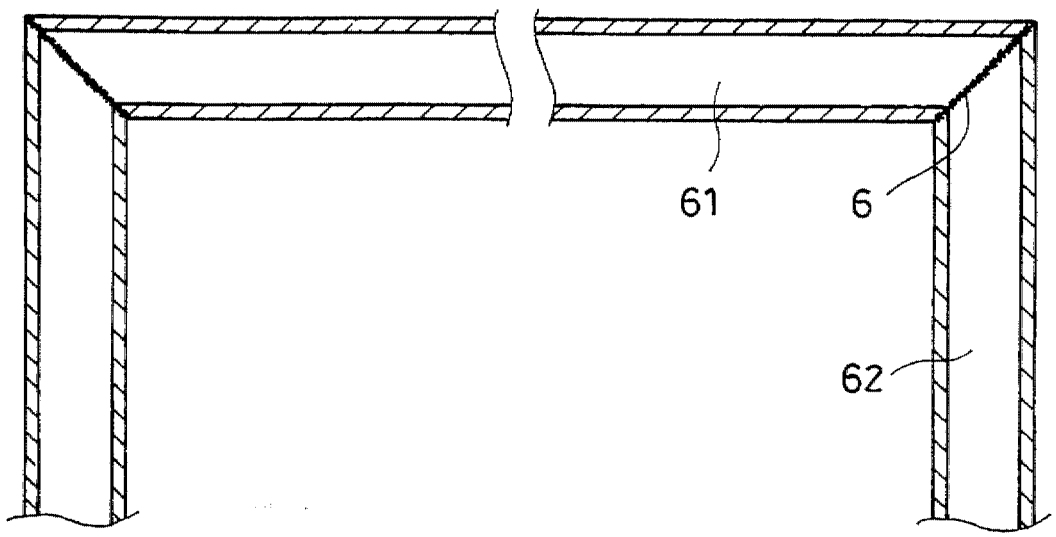
FIG. 4 is a sectional view of a conventional frame assembly utilizing welding to join the frames.
Figure 5:
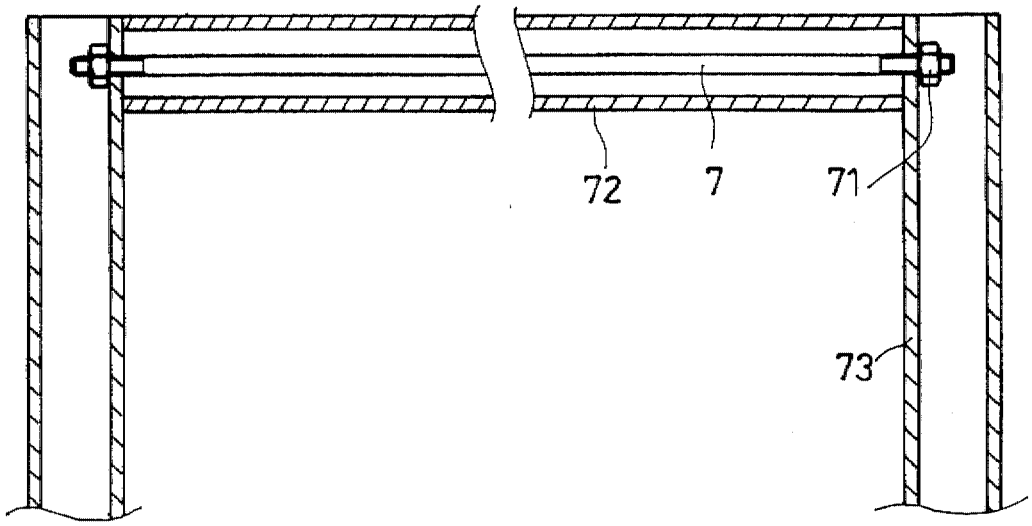
FIG. 5 is a sectional view of another conventional frame assembly utilizing an iron bar for fastening.
Figure 6:
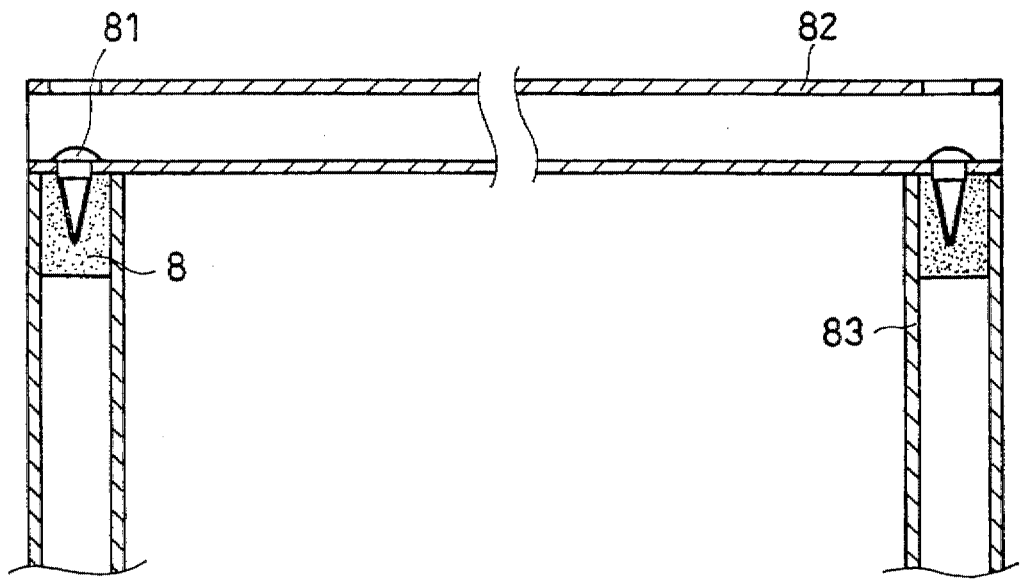
FIG. 6 is a sectional view of still another conventional frame assembly utilizing plastic plug means for fastening.

FIGS. 3, 3A, and 3B show a third preferred embodiment of the frame assembly according to the present invention employed in plain miter joints. In this example, a longitudinal frame 5 is provided with a connecting piece 51 which is configured to have an angular notch 52 at either side of a lower portion thereof. The connecting portion 11 of the fastening element 1 is fitted into a transverse frame 4 which has a plurality of locking holes 41 for matching the threaded holes 16 of the connecting portion 11 so that they may lock firmly together. The grip plate 121 and the clamp plate 13 are together fitted onto the connecting piece 51 of the longitudinal frame 5 such that the projecting hook pieces 15 of the grip plate 121 respectively hook onto the angular notches 52 of the connecting piece 51.

In view of the aforesaid, the frame assembly according to the present invention may be used to secure doors, windows and frames in a convenient and cost-effective manner in various kinds of joints.

Although the present invention has been illustrated and described with reference to the preferred embodiment thereof, it should be understood that it is in no way limited to the details of such embodiment but is capable of numerous modifications within the scope of the appended claims.

What is claimed is:

1. A frame assembly for doors and windows comprising:

a substantially right-angled fastening element having a connecting portion and a clamping portion, said connecting portion being formed by a first longitudinally extended side of said fastening element and having a side plate formed on opposing transverse sides of said first side and extending orthogonally thereto, said first side having a plurality of threaded holes formed therethrough, said clamping portion being formed by (a) a grip plate formed by a second longitudinally extended side of said fastening element, and (b) a clamp plate disposed in clamping relationship with said grip plate, said clamp plate being punched from a central portion of said connecting portion and bent into said clamping relationship with said grip plate, said grip plate having a pair of hook pieces respectively disposed at opposing transverse sides thereof adjacent a distal end of said grip plate;

a first frame having a plurality of locking holes formed therethrough and an open end, said connecting portion of said fastening element being inserted into said open end of said first frame with said plurality of locking holes disposed in respective aligned relationship with said plurality of threaded holes of said connecting portion for securement by a plurality of threaded fasteners; and, a second frame having a pair of fastening holes formed through a rear wall thereof, said clamping portion of said fastening element being coupled to said second frame with said rear wall of said second frame captured between said clamp plate and said grip plate, said pair of hook pieces being respectively engaged within said pair of fastening holes.

2. A frame assembly for doors and windows comprising:

a substantially right-angled fastening element having a connecting portion and a clamping portion, said connecting portion being formed by a first longitudinally extended side of said fastening element and having a side plate formed on opposing transverse sides of said first side and extending orthogonally thereto, said first side having a plurality of threaded holes formed therethrough, said clamping portion being formed by (a) a grip plate formed by a second longitudinally extended side of said fastening element, and (b) a clamp plate disposed in clamping relationship with said grip plate, said clamp plate being punched from a central portion of said connecting portion and bent into said clamping relationship with said grip plate, said grip plate having a pair of hook pieces respectively disposed at opposing transverse sides thereof adjacent a distal end of said grip plate;

a first frame having a plurality of locking holes formed therethrough and an open end, said connecting portion of said fastening element being inserted into said open end of said first frame with said plurality of locking holes disposed in respective aligned relationship with said plurality of threaded holes of said connecting portion for securement by a plurality of threaded fasteners; and, a second frame having opposing front and rear sides and an end having an oblique contour, said second frame including a connecting member affixed to said front side thereof, said connecting member having a pair of notches formed therein adjacent one end thereof, said clamping portion of said fastening element being coupled to said second frame with said connecting member captured between said clamp plate and said grip plate, said pair of hook pieces being respectively engaged within said pair of notches of said connecting member.

* * * * *